(12) United States Patent
Chou

(10) Patent No.: US 6,676,118 B2
(45) Date of Patent: Jan. 13, 2004

(54) ADJUSTABLE CASING FOR HELICAL SPRING

(76) Inventor: Cheng-Ming Chou, 10/F-3, No. 8, Lane 226, Jen-ai Rd., Lin 16, Nanshin Vill., Linkou Hsiang, Taipei Hsien (TW)

(*) Notice: Subject to any disclaimer, the term of this patent is extended or adjusted under 35 U.S.C. 154(b) by 127 days.

(21) Appl. No.: 09/927,523

(22) Filed: Aug. 13, 2001

(65) Prior Publication Data

US 2003/0030204 A1 Feb. 13, 2003

(51) Int. Cl.[7] .............................. F16F 1/06; F16F 1/12
(52) U.S. Cl. ..................... 267/177; 267/175; 267/255
(58) Field of Search .......................... 267/175, 177, 267/249, 250, 255

(56) References Cited

U.S. PATENT DOCUMENTS

| 1,189,375 A | * | 7/1916 | Miller | 267/255 |
| 1,309,850 A | * | 7/1919 | Horne | 267/175 |
| 2,204,725 A | * | 6/1940 | Crites | 267/175 |
| 3,041,060 A | * | 6/1962 | Jacobsen | 267/177 |
| 3,613,520 A | * | 10/1971 | Worden | 267/175 |

* cited by examiner

Primary Examiner—Matthew C. Graham
(74) Attorney, Agent, or Firm—Troxell Law Office PLLC (57) ABSTRACT

An adjustable casing for helical spring mainly includes a male and a female case, and a rotation member. A helical spring is enclosed in the casing with an end of fixedly connected to a fixing seat provided at a bottom center of the female case, and another end located in the male case. The rotation member is provided around an outer or an inner surface with a plurality of stoppers that are adapted to engage with coils of the helical spring. When the rotation member is rotated, the number of active coils of the spring subjected to a compressing or a stretching force is changed, and the modulus of elasticity of the helical spring is adjusted, accordingly. The helical spring mounted in the adjustable casing may have higher flexibility in its usage to meet requirements of different machines.

14 Claims, 12 Drawing Sheets

ADJUSTABLE CASING FOR HELICAL SPRING

FIELD OF THE INVENTION

The present invention relates to an adjustable casing for a helical spring, and more particularly to an adjustable casing including two cases and a rotation member for enclosing a helical spring therein, so that the helical spring therein could be adjusted to different modulus of elasticity to meet requirements of equipment onto which the helical spring is mounted.

BACKGROUND OF THE INVENTION

A conventional helical spring has a modulus of elasticity that is decided when the helical spring is manufactured. Since there are various kinds of machines that require different magnitudes of stretching or compressing force, helical springs of different specifications are manufactured for use on different machines. For a helical spring of a given specification and unit deformation, the lower the number of active coils of the helical spring is, the higher the modulus of elasticity is, and the larger a stretching or compressing force is needed to deform the helical spring, and the higher the number of active coils of the helical spring is, the lower the modulus of elasticity is, and the lower a stretching or compressing force is needed to deform the helical spring. Since a conventional helical spring has a specification that is designed according to the machine on which the helical spring is mounted, and the modulus of elasticity of the helical spring is not freely adjustable, the conventional helical spring has limited flexibility in its usage.

It is therefore tried by the inventor to develop an adjustable casing for helical spring to enable free adjustment of the modulus of elasticity of a helical spring mounted in the casing.

SUMMARY OF THE INVENTION

A primary object of the present invention is to provide an adjustable casing for helical spring, so that a helical spring mounted in the adjustable casing could be freely adjusted to a desired modulus of elasticity depending on actual needs of a machine to which the helical spring is mounted.

A technical principle employed by the present invention is that the modulus of elasticity of the helical spring could be changed through change of the number of active coils subjected to a compressing force or a stretching force. With the present invention, a helical spring is able to bear different stretching or compressing force while the unit deformation of the helical spring remains unchanged.

To achieve the above and other objects, the adjustable casing for helical spring of the present invention mainly includes a male and a female case, and a rotation member. A helical spring is enclosed in the casing with an end fixedly connected to a fixing seat provided at a bottom center of the female case and another end located in the male case. The rotation member is provided around an outer or an inner surface with a plurality of stoppers that are adapted to engage with coils of the helical spring. When the rotation member is rotated, the number of active coils of the spring subjected to a compressing or a stretching force is changed, and the modulus of elasticity of the helical spring is adjusted, accordingly.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
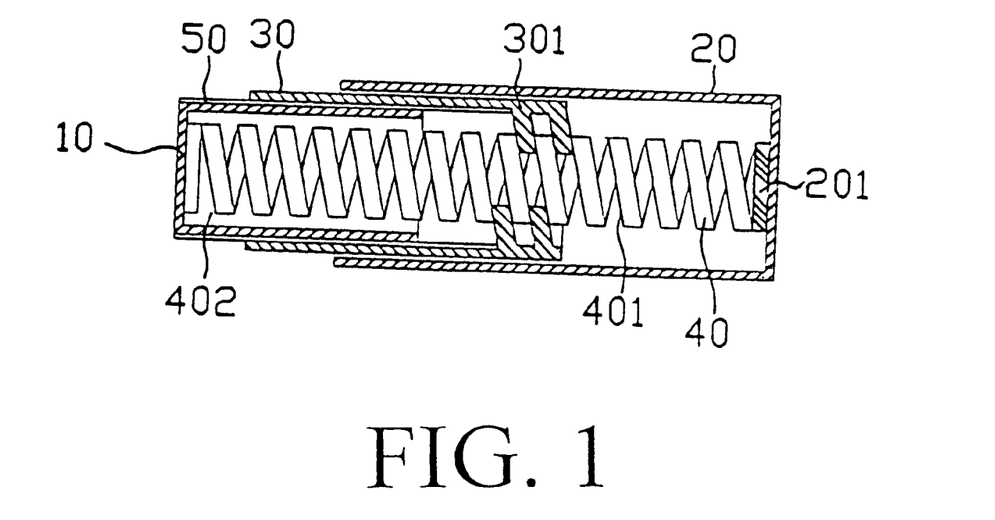
FIG. 1 is a first embodiment of the present invention shown in a vertical and a cross sectional view thereof.

Please refer to FIG. 1 that shows an adjustable casing for helical spring according to a first embodiment of the present invention. As shown, the adjusting casing mainly includes a male case 10, a female case 20, and a rotation member 30. The female case 20 is provided at an inner bottom center with a fixing seat 201. The rotation member 30 is a hollow sleeve member movably located between the male and the female cases 10, 20, and is provided around an inner surface at predetermined positions with a plurality of stoppers 301. The male case 10 has an outer diameter slightly smaller than an inner diameter of the rotation member 30, and the rotation member 30 has an outer diameter slightly smaller than an inner diameter of the female case 20. A pair of screw threads 50 are correspondingly formed on an outer surface of the male case 10 and the inner surface of the rotation member 30 in contact with each other, so that the male case 10 and the rotation member 30 are rotatably connected to each other. A helical spring 40 is enclosed in a spring chamber 402 defined between the male case 10 and the stoppers 301 of the rotation member 30. An end of the helical spring 40 is fixedly connected to the fixing seat 201 in the female case 20 and another end of the helical spring 40 is located in the male case 10, such that some coils 401 of the helical spring 40 fitly engage with the stoppers 301 in the rotation member 30. When the helical spring 40 is subject to a stretching or a compressing force, the female case 20 does not frictionally contact with the rotation member 30. When the rotation member 30 is rotated along the screw threads 50, the stoppers 301 in the rotation member 30 remain in contact with and are guided by the coils 401 to move along the helical spring 40, and thereby change the number of active coils 401 of the helical spring 40 between the stoppers 301 and the bottom of the female case 20, that is, the number of active coils 401 that would be subject to a compressing or a stretching force. Each of the screw threads 50 has a screw pitch that is equal to a coil pitch of the coils 401. Therefore, when the rotation member 30 is rotated by one full circle, it moves along the helical spring 40 by one coil pitch of thereof and thereby changes the number of active coils 401 by one. At this point, the modulus of elasticity of the helical spring 40 is changed.

Figure 2:
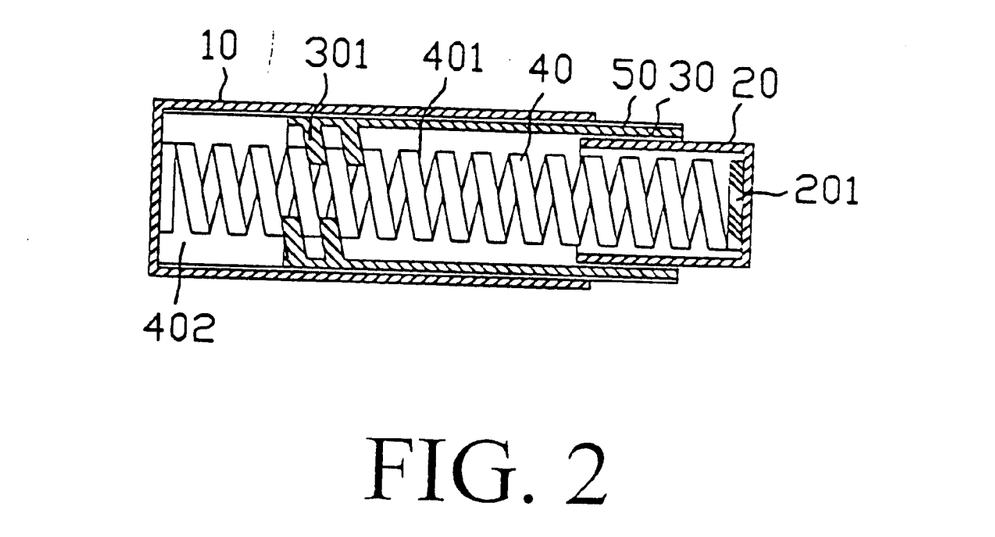
FIG. 2 is a second embodiment of the present invention shown in a vertical and a cross sectional view thereof.

FIG. 2 shows a second embodiment of the present invention. This second embodiment is structurally and functionally similar to the first embodiment, except that the male case 10 has an inner diameter slightly larger than an outer diameter of the rotation member 30, and the rotation member 30 has an inner diameter slightly larger than an outer diameter of the female case 20, and a pair of screw threads 50 are correspondingly provided on an inner surface of the male case 10 and an outer surface of the rotation member 30 that are in contact with each other.

Figure 3:
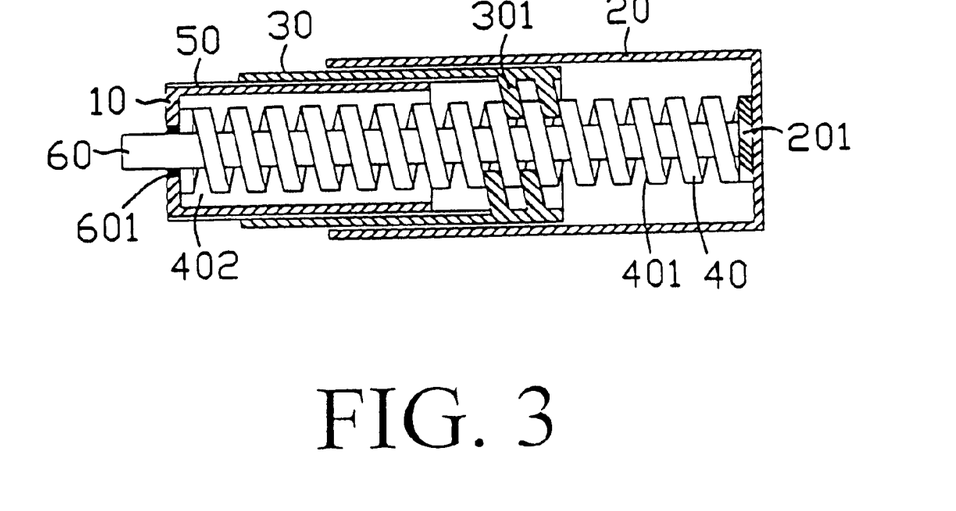
FIG. 3 is a third embodiment of the present invention shown in a vertical and a cross sectional view thereof.

FIG. 3 shows an adjustable casing for helical spring according to a third embodiment of the present invention. As shown, this third embodiment is structurally and functionally similar to the first embodiment, except that an internal slide shaft 60 is provided to extend along a central axis of the male and the female cases 10, 20. The internal slide shaft 60 has an end fixedly connected to the fixing seat 201 in the female case 20. That is, both the internal slide shaft 60 and the helical spring 40 are fixedly connected at an end to the fixing seat 201. Another end of the internal slide shaft 60 is extended through a shaft hole provided at a bottom center of the male case 10 and is associated with the shaft hole by means of an oil-sealing ring 601 or other functionally similar element. When the helical spring 40 is subject to a force, the male case 10 remains unmoved, and the female case 20 drives the internal slide shaft 60 to move, so that the helical spring 40 deforms only in an axial direction.

Figure 4:
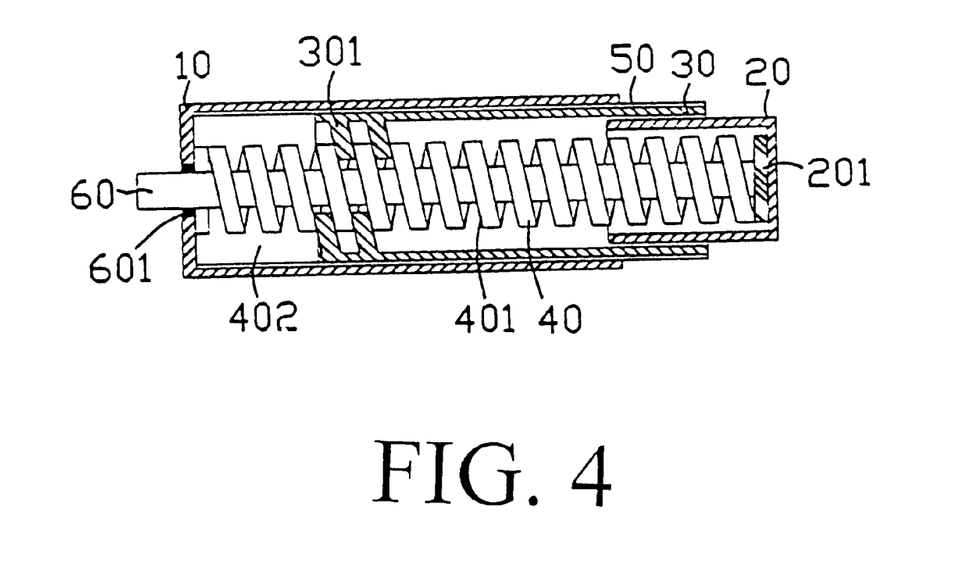
FIG. 4 is a fourth embodiment of the present invention shown in a vertical and a cross sectional view thereof.

FIG. 4 shows a fourth embodiment of the present invention that is structurally and functionally similar to the third embodiment, except that the male case 10 has an inner diameter slightly larger than an outer diameter of the rotation member 30, and the rotation member 30 has an inner diameter slightly larger than an outer diameter of the female case 20, and a pair of screw threads 50 are correspondingly provided on an inner surface of the male case 10 and an outer surface of the rotation member 30 that are in contact with each other.

Figure 5:
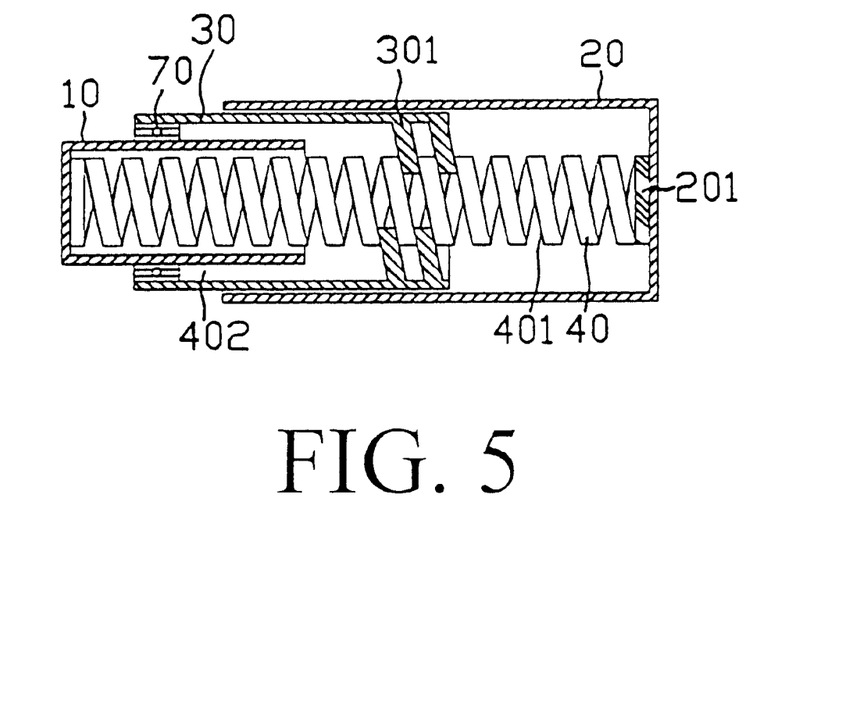
FIG. 5 is a fifth embodiment of the present invention shown in a vertical and a cross sectional view thereof.

FIG. 5 shows an adjustable casing for helical spring according to a fifth embodiment of the present invention. As shown, this fifth embodiment is structurally and functionally similar to the first embodiment, except that the screw threads 50 are replaced with a bearing 70 or other functionally similar element to rotatably connect the male case 10 to the rotation member 30. When the rotation member 30 is rotated for the stoppers 301 to release some of the coils 401 from the spring chamber 402, the female case 20 is pushed toward a direction opposite to the male case 10 and the number of active coils 401 as well as an overall length of the adjustable casing for the helical spring are increased. To the contrary, when the rotation member 30 is rotated for the stoppers 301 to move coils 401 in the female case 20 back into the spring chamber 402, the number of the active coils 401 as well as the overall length of the adjustable casing decrease.

Figure 6:
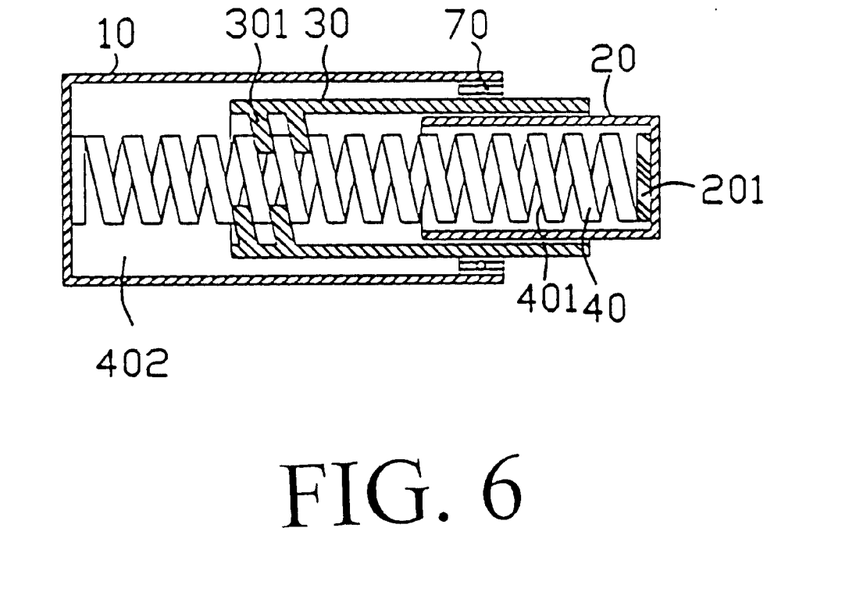
FIG. 6 is a sixth embodiment of the present invention shown in a vertical and a cross sectional view thereof.

FIG. 6 shows a sixth embodiment of the present invention that is structurally and functionally similar to the fifth embodiment, except that the male case 10 has an inner diameter slightly larger than an outer diameter of the rotation member 30, and the rotation member 30 has an inner diameter slightly larger than an outer diameter of the female case 20, and the bearing 70 is correspondingly provided between an inner surface of the male case 10 and an outer surface of the rotation member 30 that are in contact with each other.

Figure 7:
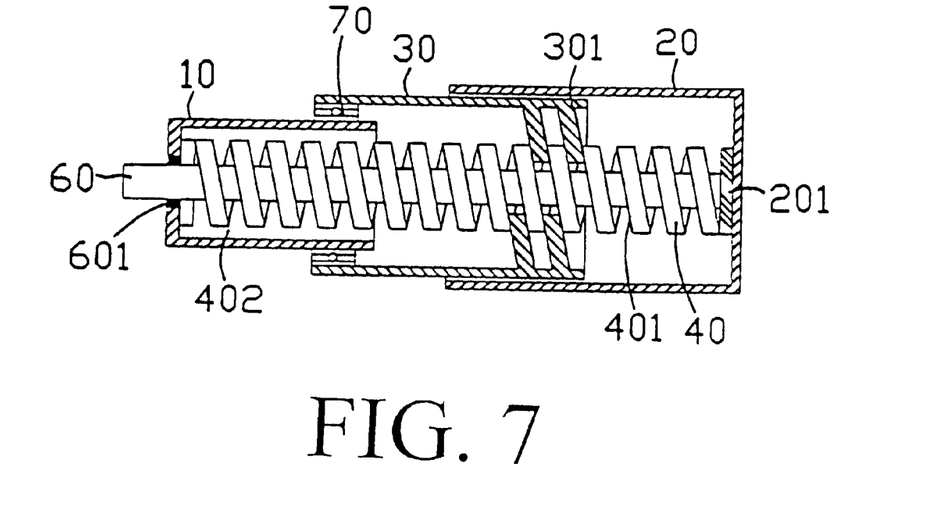
FIG. 7 is a seventh embodiment of the present invention shown in a vertical and a cross sectional view thereof.

FIG. 7 shows a seventh embodiment of the present invention that is structurally and functionally similar to the fifth embodiment, except that an internal slide shaft 60 is provided to extend along a central axis of the male and the female cases 10, 20. The internal slide shaft 60 and the helical spring 40 all have an end fixedly connected to the fixing seat 201 in the female case 20. Another end of the internal slide shaft 60 is extended through a shaft hole provided at a bottom center of the male case 10 and is associated with the shaft hole by means of an oil-sealing ring 601 or other functionally similar element. When the helical spring 40 is subject to a force, the male case 10 remains unmoved, and the female case 20 drives the internal slide shaft 60 to move, so that the helical spring 40 deforms only in an axial direction.

Figure 8:
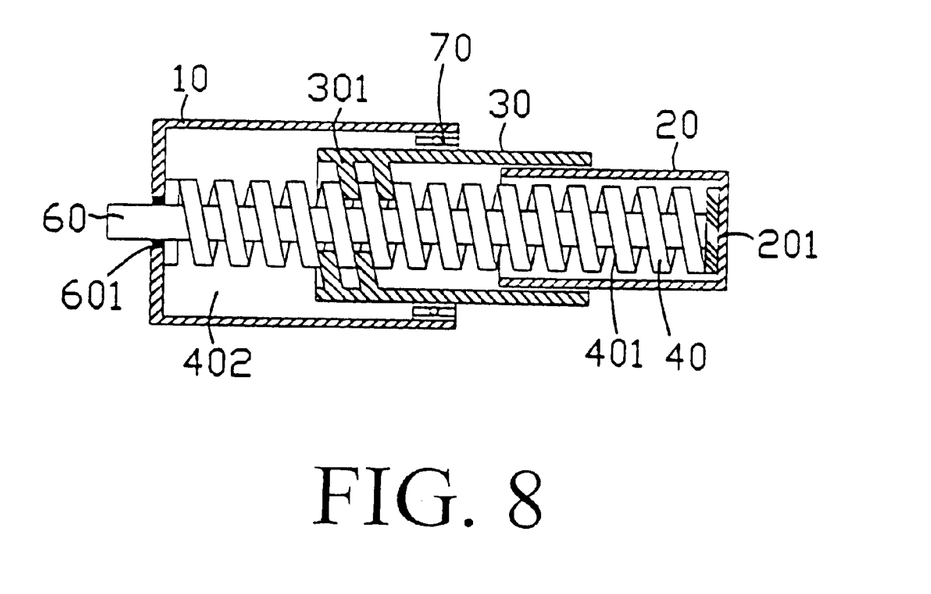
FIG. 8 is an eighth embodiment of the present invention shown in a vertical and a cross sectional view thereof.

FIG. 8 shows an eighth embodiment of the present invention that is structurally and functionally similar to the seventh embodiment, except that the male case 10 has an inner diameter slightly larger than an outer diameter of the rotation member 30, and the rotation member 30 has an inner diameter slightly larger than an outer diameter of the female case 20.

Figure 9:
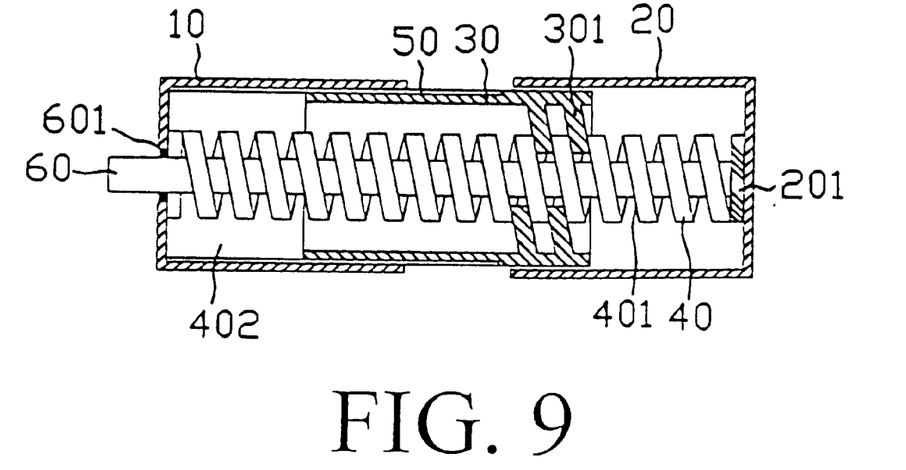
FIG. 9 is a ninth embodiment of the present invention shown in a vertical and a cross sectional view thereof.

FIG. 9 shows a ninth embodiment of the present invention. In this embodiment, the rotation member 30 has an outer diameter slightly smaller than an inner diameter of the male case 10 and of the female case 20, and the female case 20 only serves to fix the helical spring 40 and the internal slide shaft 60 in place and does not enclose or encloses only a part of the helical spring 40. A pair of screw threads 50 are correspondingly provided on an inner surface of the male case 10 and an outer surface of the rotation member 30 for the male case 10 and the rotation member 30 to rotatably connect to each other. An internal slide shaft 60 is provided to extend along a central axis of the male and the female cases 10, 20. The internal slide shaft 60 and the helical spring 40 all have an end fixedly connected to the fixing seat 201 in the female case 20. Another end of the internal slide shaft 60 is extended through a shaft hole provided at a bottom center of the male case 10 and is associated with the shaft hole by means of an oil-sealing ring 601 or other functionally similar element. When the helical spring 40 is subject to a force, the male case 10 remains unmoved, and the female case 20 drives the internal slide shaft 60 to move, so that the helical spring 40 deforms only in an axial direction.

Figure 10:
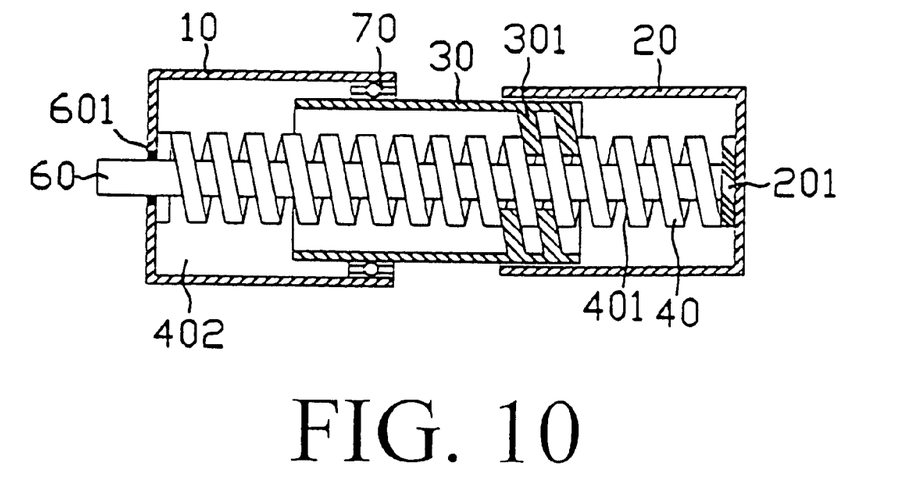
FIG. 10 is a tenth embodiment of the present invention shown in a vertical and a cross sectional view thereof.

FIG. 10 shows a tenth embodiment of the present invention that is structurally and functionally similar to the ninth embodiment, except that the screw threads 50 are replaced with a bearing 70 or other functionally similar element to rotatably connect the male case 10 to the rotation member 30.

Figure 11:
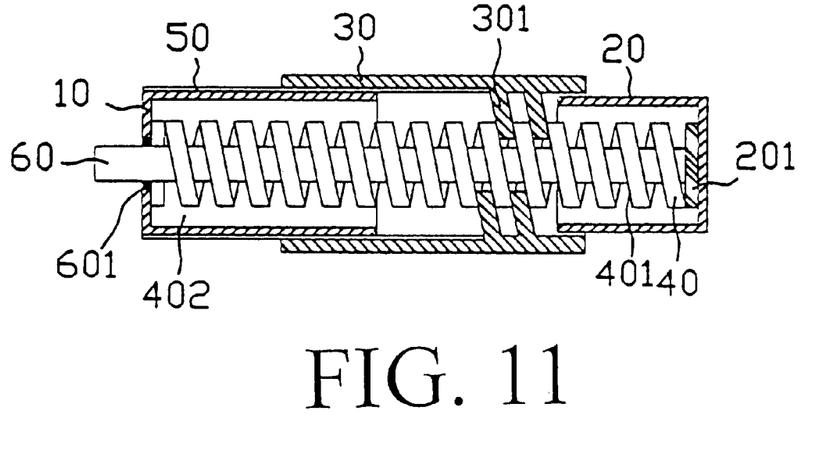
FIG. 11 is an eleventh embodiment of the present invention shown in a vertical and a cross sectional view thereof.

FIG. 11 shows an eleventh embodiment of the present invention that is structurally and functionally similar to the ninth embodiment, except that the rotation member 30 has an inner diameter slightly larger than an outer diameter of the male case 10 and of the female case 20. The female case 20 only serves to locate the helical spring 40 and the internal slide shaft 60 in place and does not enclose or encloses only a part of the helical spring 40. A pair of screw threads 50 are correspondingly provided on an outer surface of the male case 10 and an inner surface of the rotation member 30 for the male case 10 and the rotation member 30 to rotatably connect to each other.

Figure 12:
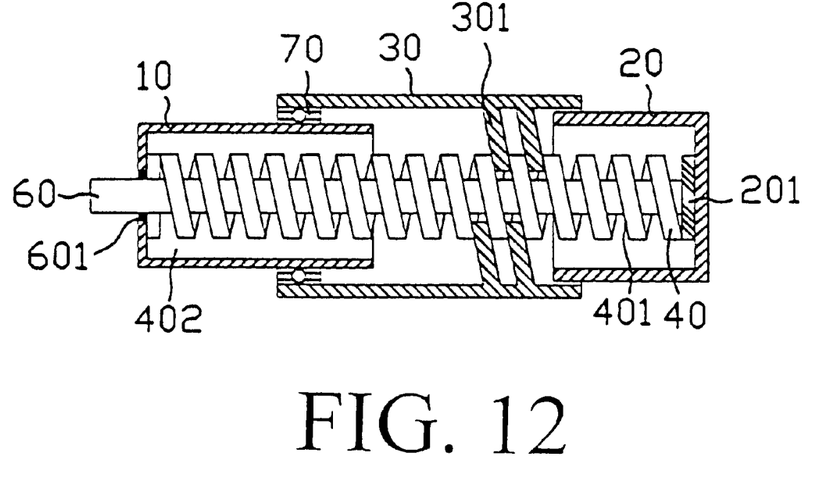
FIG. 12 is a twelfth embodiment of the present invention shown in a vertical and a cross sectional view thereof.

FIG. 12 shows a twelfth embodiment of the present invention that is structurally and functionally similar to the eleventh embodiment, except that the screw threads 50 are replaced with a bearing 70 or other functionally similar element to rotatably connect the male case 10 to the rotation member 30.

Figure 13:
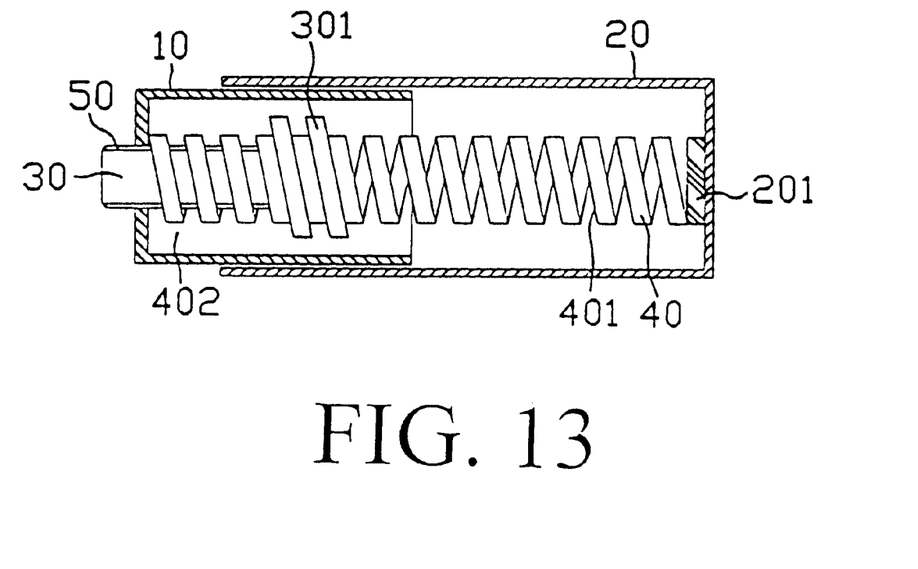
FIG. 13 is a thirteenth embodiment of the present invention shown in a vertical and a cross sectional view thereof.

FIG. 13 shows an adjustable casing for helical spring according to a thirteenth embodiment of the present invention. The adjustable casing of this embodiment includes a male case 10, a female case 20, and a rotation member 30. The female case 20 has an inner diameter slightly larger than an outer diameter of the male case 10 and is provided at an inner bottom center with a fixing seat 201. A helical spring 40 is fixedly connected at an end to the fixing seat 201 with another end thereof located in the male case 10. The rotation member 30 is a hollow sleeve member extended through a central hole provided at the bottom of the male case 10. The rotation member 30 is provided around an outer surface at predetermined positions with a plurality of stoppers 301 to engage with coils 401 of the helical spring 40 for adjusting a modulus of elasticity of the helical spring 40. A pair of screw threads 50 are correspondingly provided at an inner surface of the bottom central hole of the male case 10 and an outer surface of the rotation member 30 for the male case 10 and the rotation member 30 to rotatably connect to each other. When the helical spring 40 is subject to a stretching or a compressing force, the female case 20 does not frictionally contact with the male case 10. When the rotation member 30 is rotated along the screw threads 50, the stoppers 301 on the outer surface of the rotation member 30 remain in contact with and are guided by the coils 401 to move along the helical spring 40, and thereby change the number of active coils 401 of the helical spring 40. The screw thread 50 has a screw pitch that is equal to a coil pitch of the coils 401. Therefore, when the rotation member 30 is rotated by one full circle, it moves along the helical spring 40 by one coil pitch of thereof and thereby changes the number of active coils 401 by one. At this point, the modulus of elasticity of the helical spring 40 is changed.

Figure 14:
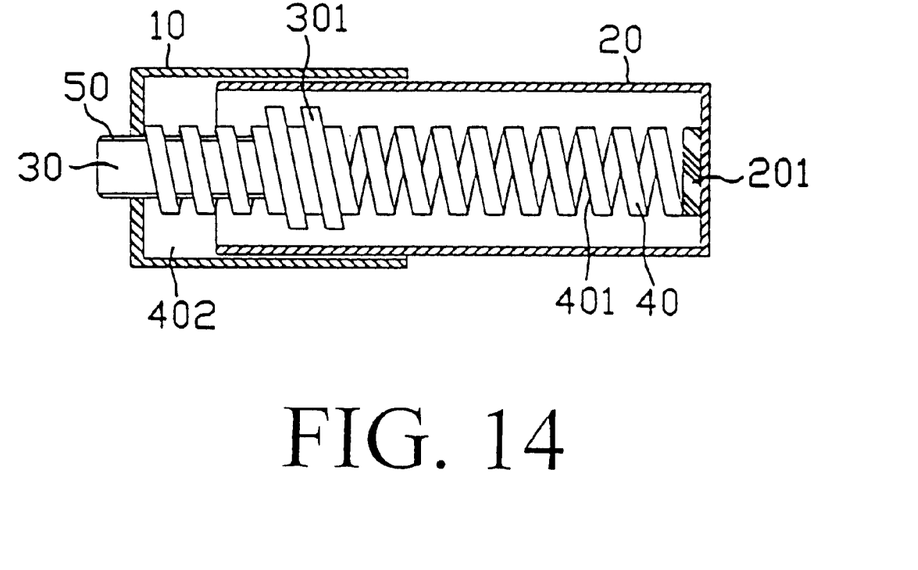
FIG. 14 is a fourteenth embodiment of the present invention shown in a vertical and a cross sectional view thereof.

FIG. 14 shows a fourteenth embodiment of the present invention that is structurally and functionally similar to the thirteenth embodiment, except that the male case 10 has an inner diameter slightly larger than an outer diameter of the female case 20.

Figure 15:
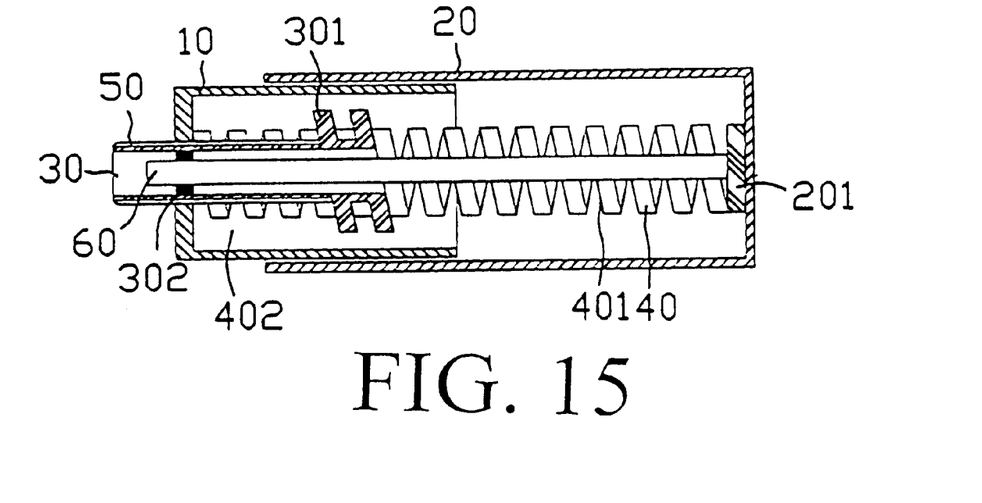
FIG. 15 is a fifteenth embodiment of the present invention shown in a vertical and a cross sectional view thereof.

FIG. 15 shows a fifteenth embodiment of the present invention that is structurally and functionally similar to the thirteenth embodiment, except that an internal slide shaft 60 is provided in the rotation member 30. The internal slide shaft 60 has an end fixedly connected to the fixing seat 201 in the female case 20, and another end associated with an end of the rotation member 30 by means of an oil-sealing ring 302 or other functionally similar element. When the helical spring 40 is subject to a force, the male case 10 remains unmoved, and the female case 20 drives the internal slide shaft 60 to move, so that the helical spring 40 deforms only in an axial direction.

Figure 16:
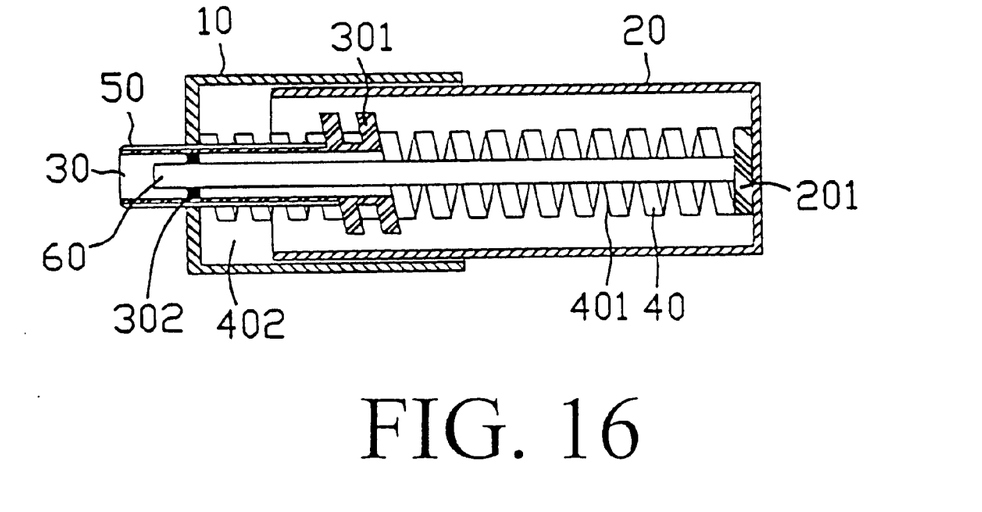
FIG. 16 is a sixteenth embodiment of the present invention shown in a vertical and a cross sectional view thereof.

FIG. 16 shows a sixteenth embodiment of the present invention that is structurally and functionally similar to the fifteenth embodiment, except that the male case 10 has an inner diameter slightly larger than an outer diameter of the female case 20.

Figure 17:
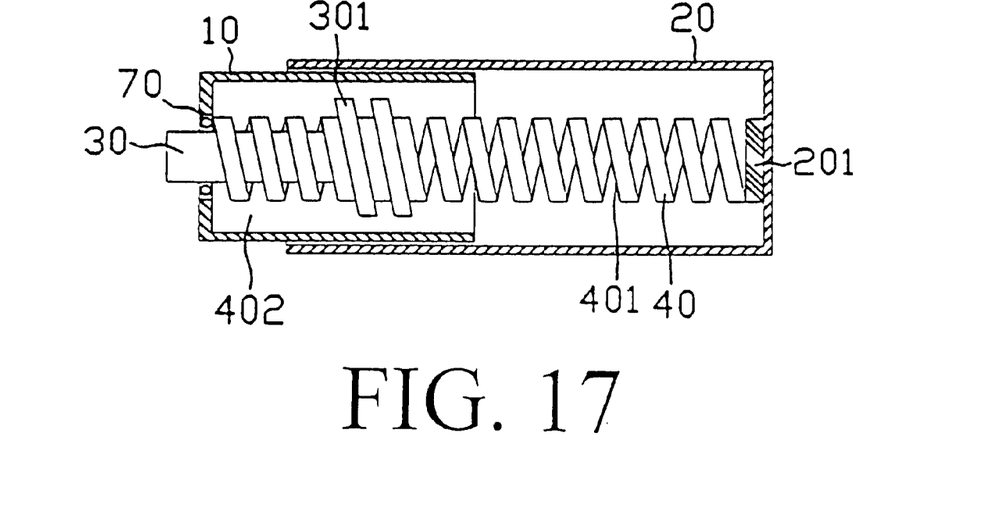
FIG. 17 is a seventeenth embodiment of the present invention shown in a vertical and a cross sectional view thereof.

FIG. 17 shows a seventeenth embodiment of the present invention that is structurally and functionally similar to the thirteenth embodiment, except that the screw threads 50 are replaced with a bearing 70 or other functionally similar element to rotatably connect the male case 10 to the rotation member 30. When the rotation member 30 is rotated for the stoppers 301 to release some of the coils 401 from the spring chamber 402, the female case 20 is pushed toward a direction opposite to the male case 10 to increase an overall length of the adjustable casing for the helical spring.

Figure 18:
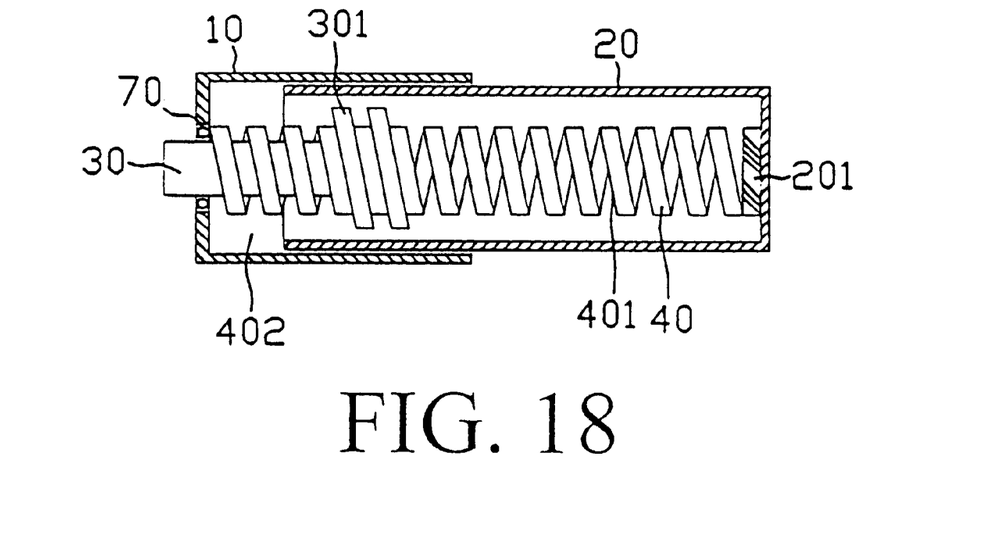
FIG. 18 is an eighteenth embodiment of the present invention shown in a vertical and a cross sectional view thereof.

FIG. 18 shows an eighteenth embodiment of the present invention that is structurally and functionally similar to the seventeenth embodiment, except that the male case 10 has an inner diameter slightly larger than an outer diameter of the female case 20.

Figure 19:
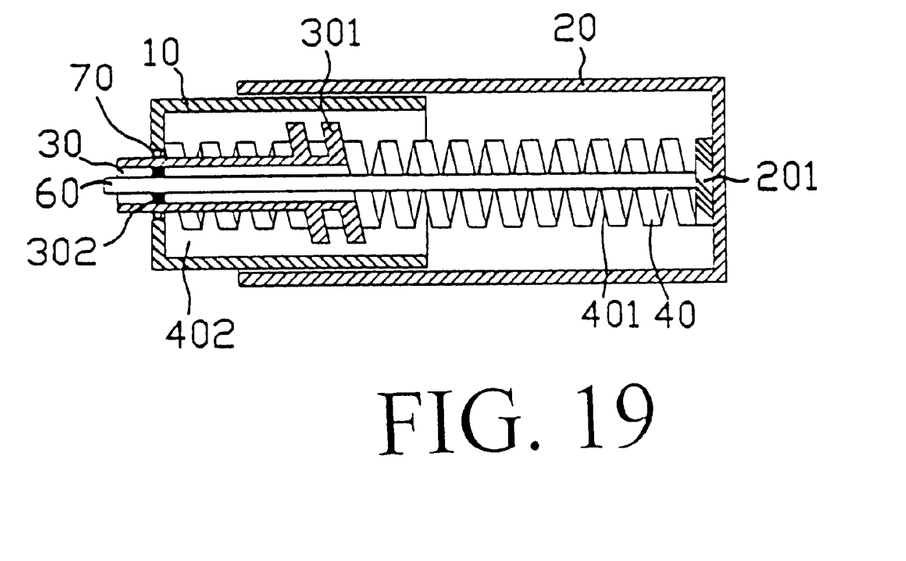
FIG. 19 is a nineteenth embodiment of the present invention shown in a vertical and a cross sectional view thereof.

FIG. 19 shows a nineteenth embodiment of the present invention that is structurally and functionally similar to the seventeenth embodiment, except that an internal slide shaft 60 is provided in the rotation member 30. The internal slide shaft 60 has an end fixedly connected to the fixing seat 201 in the female case 20, and another end associated with an end of the rotation member 30 by means of an oil-sealing ring 302 or other functionally similar element, so that the helical spring 40 deforms only in an axial direction.

Figure 20:
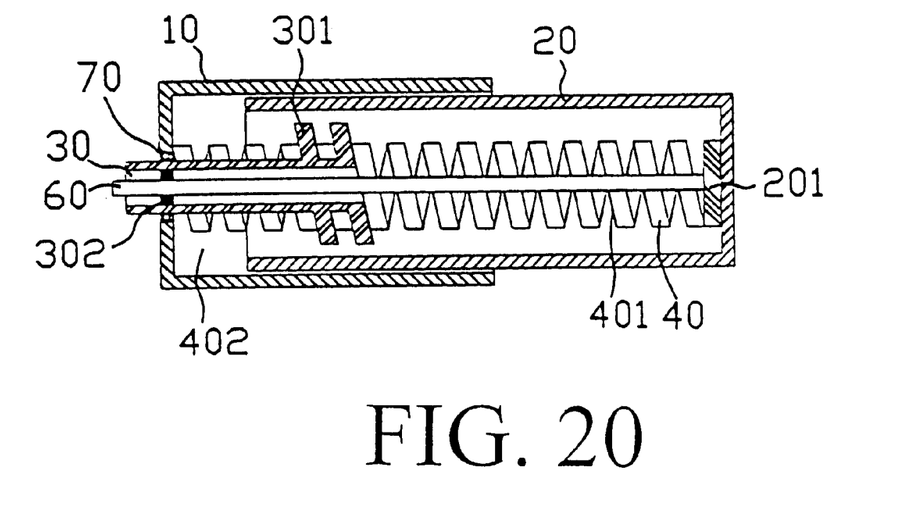
FIG. 20 is a twentieth embodiment of the present invention shown in a vertical and a cross sectional view thereof.

FIG. 20 shows a twentieth embodiment of the present invention that is structurally and functionally similar to the nineteenth embodiment, except that the male case 10 has an inner diameter slightly larger than an outer diameter of the female case 20.

Figure 21:
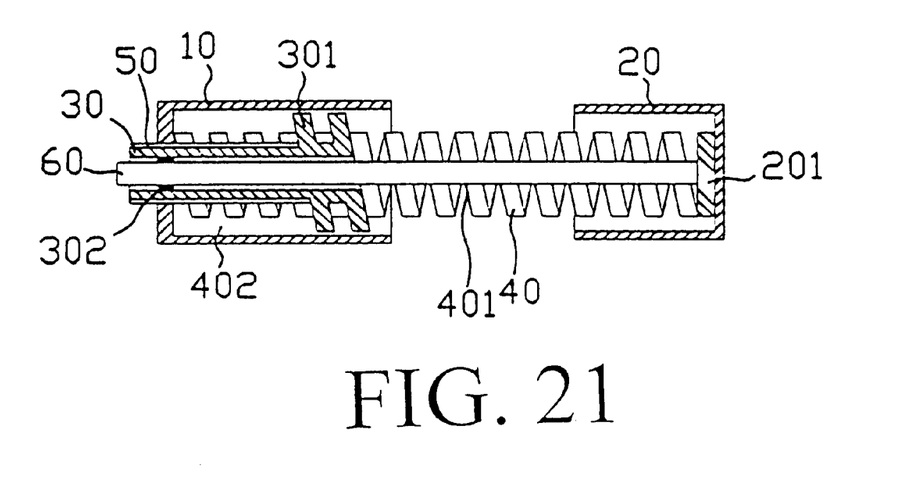
FIG. 21 is a twenty-first embodiment of the present invention shown in a vertical and a cross sectional view thereof.

FIG. 21 shows an adjustable casing for helical spring according to a twenty-first embodiment of the present invention. The adjustable casing in this embodiment includes a male case 10, a female case 20, a rotation member 30, and an internal slide shaft 60. The male case 10 only serves to engage with the rotation member 30 and does not enclose or only encloses a part of the helical spring 40. The female case 20 only serves to fix the an end of the helical spring 40 and of the internal slide shaft 60 and does not enclose or only encloses a part of the helical spring 40. A pair of screw threads 50 are correspondingly provided at an inner surface of a bottom central hole of the male case 10 and an outer surface of the rotation member 30 for the male case 10 and the rotation member 30 to rotatably connect to each other. The internal slide shaft 60 is extended through the rotation member 30 with an end fixedly connected to a fixing seat 201 in the female case 20 and another end associated with an end of the rotation member 30 by means of an oil-sealing ring 302 or other functionally similar element, so that the helical spring 40 deforms only in an axial direction.

Figure 22:
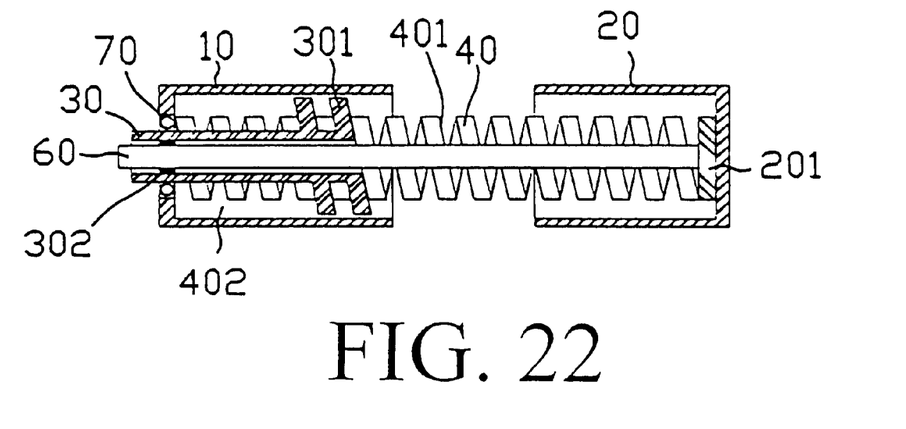
FIG. 22 is a twenty-second embodiment of the present invention shown in a vertical and a cross sectional view thereof.

FIG. 22 shows a twenty-second embodiment of the present invention that is structurally and functionally similar to the twenty-first embodiment, except that the screw threads 50 are replaced with a bearing 70 or other functionally similar element to rotatably connect the male case 10 to the rotation member 30.

Figure 23:
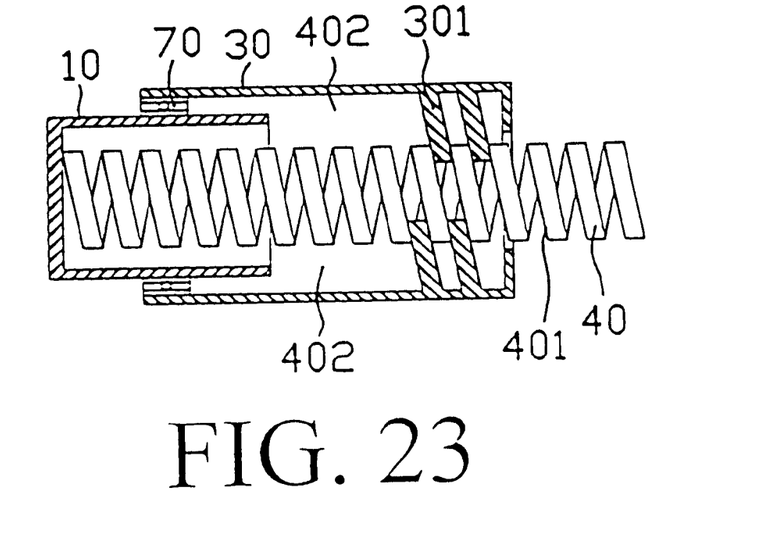
FIG. 23 is a twenty-third embodiment of the present invention shown in a vertical and a cross sectional view thereof.

FIG. 23 shows an adjustable casing for helical spring according to a twenty-third embodiment of the present invention. The adjustable casing in this embodiment includes only a male case 10 and a rotation member 30 rotatably connected to the male case 10 for stretching a helical spring 40. The male case 10 has an outer diameter slightly smaller than an inner diameter of the rotation member 30. The helical spring 40 has an end tightly pressed against a bottom of the male case 10 and another end having a hook fixedly connected thereto. The helical spring 40 is compressed in a spring chamber 402 defined between the male case 10 and stoppers 301 provided in the rotation member 30, such that some coils 401 of the spring 40 engage with the stoppers 301. When the rotation member 30 is rotated in a first direction, some coils 401 are released from the spring chamber 402, and when the rotation member 30 is rotated in a second direction, the coils 401 are moved into the spring chamber 402 and the helical spring 40 is compressed.

Figure 24:
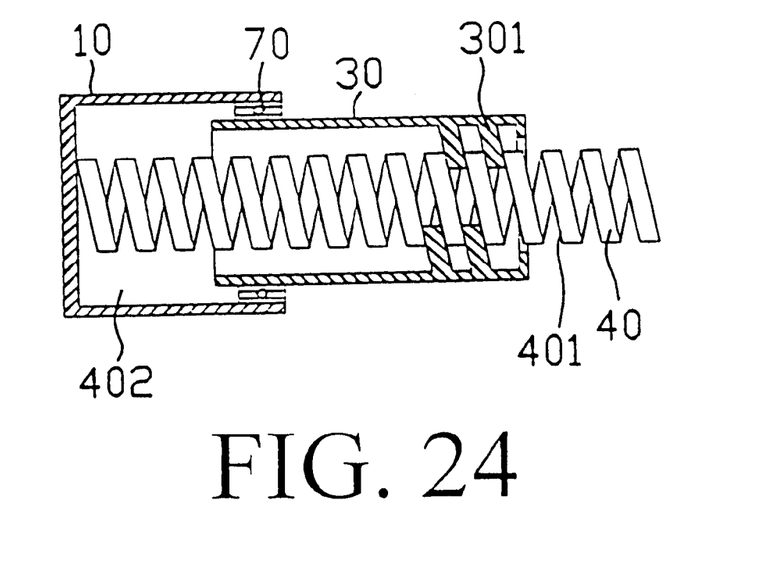
FIG. 24 is a twenty-fourth embodiment of the present invention shown in a vertical and a cross sectional view thereof.

FIG. 24 shows a twenty-fourth embodiment of the present invention that is structurally and functionally similar to the twenty-third embodiment, except that the male case 10 has an inner diameter slightly larger than an outer diameter of the rotation member 30.

In brief, the adjustable casing for helical spring of the present invention enables a helical spring to be freely adjusted to different modulus of elasticity to meet requirements of a machine on which the helical spring is mounted for use. Therefore, the helical spring mounted in the adjustable casing of the present invention may have higher flexibility in its usage.

What is claimed is:

1. An adjustable casing for helical spring, comprising:
   a male case;
   a female case axially movable relative to said male case and having an inner bottom center with a fixing seat for a helical spring to connect an end thereto; and
   a hollow rotation member located between said male and said female case and having an inner surface with a plurality of stoppers adapted to engage with coils of said helical spring, said stoppers and said male case together defining a spring chamber between an inner bottom of said male case and said stoppers; wherein said rotation member has a diameter between a diameter of said male case and a diameter of said female case.

2. The adjustable casing for helical spring as claimed in claim 1, wherein said male case and said rotation member are rotatably connected to each other through engagement of a pair of screw threads correspondingly provided on surfaces of said male case and said rotation member that are in contact with each other, whereby said rotation member is rotatable to move in a direction the same as that of a stretching or a compressing force applied on said helical spring and to change the number of active coils of said helical spring and accordingly a modulus of elasticity of said helical spring.

3. The adjustable casing for helical spring as claimed in claim 1, wherein said male case and said rotation member are rotatably connected to each other through engagement of a pair of screw threads correspondingly provided on surfaces of said male case and said rotation member that are in contact with each other, whereby said rotation member is rotatable to move in a direction the same as that of a stretching or a compressing force applied on said helical spring and to change the number of active coils of said helical spring and accordingly a modulus of elasticity of said helical spring; and wherein an internal slide shaft is extended along a central axis of said male and said female cases, said internal slide shaft having an end fixedly connected to said fixing seat on said female case and another end associated with a shaft hole provided at a bottom center of said male case by means of an oil-seal ring, such that said helical spring is allowed for axial deformation in said adjustable casing.

4. The adjustable casing for helical spring as claimed in claim 1, wherein said male case and said rotation member are rotatably connected to each other through a bearing device provided between surfaces of said male case and said rotation member; whereby when said rotation member is rotated, coils of said helical spring are released from said spring chamber and thereby push said female case away from said male case to increase an overall length of said adjustable casing.

5. The adjustable casing for helical spring as claimed in claim 1, wherein said male case and said rotation member are rotatably connected to each other through a bearing provided between surfaces of said male case and said rotation member; and wherein an internal slide shaft is extended along a central axis of said male and said female cases, said internal slide shaft having an end fixedly connected to said fixing seat on said female case and another end associated with a shaft hole provided at a bottom center of said male case by means of an oil-seal ring, such that said helical spring is allowed for axial deformation in said adjustable casing.

6. The adjustable casing for helical spring as claimed in claim 1, wherein an inner diameter of said rotation member is larger than an outer diameter of said male case, and said female case only serving to fix said helical spring and an internal slide shaft enclosing no more than a part of said helical spring; said male case and said rotation member being rotatably connected to each other through engagement of a pair of screw threads separately provided on said outer diameter of said male case and said inner diameter of said rotation member that are in contact with each other; and said internal slide shaft being extended along a central axis of said male and said female cases, and having an end fixedly connected to said fixing seat on said female case and another end associated with a shaft hole provided at a bottom center of said male case by means of an oil-seal ring, such that said helical spring is allowed for axial deformation in said adjustable casing.

7. The adjustable casing for helical spring as claimed in claim 1, wherein an inner diameter of said rotation member is larger than an outer diameter of said male case, and said female case only serving to fix said helical spring and an internal slide shaft enclosing no more than a part of said helical spring; said male case and said rotation member being rotatably connected to each other through a bearing device provided on said outer diameter of said male case and said inner diameter of said rotation member; and said internal slide shaft extends along a central axis of said male and said female cases, and having an end fixedly connected to said fixing seat on said female case and another end associated with a shaft hole provided at a bottom center of said male case by means of an oil-seal ring element, such that said helical spring is allowed axial deformation in said adjustable casing.

8. An adjustable casing for helical spring, comprising:
 a male case having a bottom with a central hole;
 a female case axially movable relative to said male case and having an inner bottom center with a fixing seat for a helical spring to connect an end thereto; said female case having a diameter different than a diameter of said male case;
 a hollow rotation member connected at an end to said bottom central hole on said male case, and having an outer surface with a plurality of stoppers adapted to engage with coils of said helical spring, said stoppers and said male case together defining a spring chamber between an inner bottom of said male case and said stoppers.

9. The adjustable casing for helical spring as claimed in claim 8, wherein said male case and said rotation member are rotatably connected to each other through engagement of a pair of screw threads correspondingly provided on an inner surface of said bottom central hole of said male case and an outer surface of said rotation member that are in contact with each other, whereby said rotation member is rotatable to move in a direction the same as that of a stretching or a compressing force applied on said helical spring and to change the number of active coils of said helical spring and accordingly a modulus of elasticity of said helical spring.

10. The adjustable casing for helical spring as claimed in claim 8, wherein said male case and said rotation member are rotatably connected to each other through engagement of a pair of screw threads correspondingly provided on an inner surface of said bottom central hole of said male case and an outer surface of said rotation member that are in contact with each other; and wherein an internal slide shaft is received in said rotation member, said internal slide shaft having an end fixedly connected to said fixing seat on said female case and another end associated with an end of said rotation member by means of an oil-seal ring element, such that said helical spring is allowed axial deformation in said adjustable casing.

11. The adjustable casing for helical spring as claimed in claim 8, wherein said male case and said rotation member are rotatably connected to each other through a bearing element provided between an inner surface of said bottom central hole of said male case and an outer surface of said rotation member; whereby when said rotation member is rotated, coils of said helical spring are released from said spring chamber and thereby push one of said male and female cases to increase an overall length of said adjustable casing.

12. The adjustable casing for helical spring as claimed in claim 8, wherein said male case and said rotation member are rotatably connected to each other through a bearing provided between an inner surface of said bottom central hole of said male case and an outer surface of said rotation member; and wherein an internal slide shaft is received in said rotation member, said internal slide shaft having an end fixedly connected to said fixing seat on said female case and another end associated with an end of said rotation member by means of an oil-seal ring element, such that said helical spring is allowed axial deformation in said adjustable casing.

13. The adjustable casing for helical spring as claimed in claim 8, wherein said female case only serves to fix said helical spring and an internal slide shaft enclosing no more than a part of said helical spring, and said male case only serving to connect with said rotation member enclosing no more than a part of said helical spring; and wherein said male case and said rotation member are rotatably connected to each other through engagement of a pair of screw threads correspondingly provided on an inner surface of said bottom central hole of said male case and an outer surface of said rotation member that are in contact with each other; and wherein an internal slide shaft is received in said rotation member, said internal slide shaft having an end fixedly connected to said fixing seat on said female case and another end associated with an end of said rotation member by means of an oil-seal ring element, such that said helical spring is allowed axial deformation in said adjustable casing.

14. The adjustable casing for helical spring as claimed in claim 8, wherein said female case only serves to fix said helical spring and said internal slide shaft enclosing no more than a part of said helical spring, and said male case only serving to connect with said rotation member enclosing no more than a part of said helical spring; and wherein said male case and said rotation member are rotatably connected to each other through a bearing element provided between an inner surface of said bottom central hole of said male case and an outer surface of said rotation member; and wherein an internal slide shaft is received in said rotation member, said internal slide shaft having an end fixedly connected to said fixing seat on said female case and another end associated with an end of said rotation member by means of an oil-seal ring element, such that said helical spring is allowed axial deformation in said adjustable casing.

\* \* \* \* \*